US006195754B1

(12) United States Patent
Jardine et al.

(10) Patent No.: US 6,195,754 B1
(45) Date of Patent: Feb. 27, 2001

(54) METHOD AND APPARATUS FOR TOLERATING POWER OUTAGES OF VARIABLE DURATION IN A MULTI-PROCESSOR SYSTEM

(75) Inventors: Robert L. Jardine, Cupertino; Larry D. Reeves, Palo Alto; Murali Basavaiah; Garry Easop, both of Sunnyvale, all of CA (US)

(73) Assignee: Tandem Computers Incorporated, Cupertino, CA (US)

( * ) Notice: Subject to any disclaimer, the term of this patent is extended or adjusted under 35 U.S.C. 154(b) by 0 days.

(21) Appl. No.: 08/789,260

(22) Filed: Jan. 28, 1997

(51) Int. Cl.[7] ....................................... G06F 1/30
(52) U.S. Cl. ..................... 713/324; 713/330; 713/340; 714/14; 714/24
(58) Field of Search .................. 395/750.01, 750.08; 364/492, 493; 713/300, 310, 320, 322, 323, 324, 330, 340; 714/14, 15, 22, 24

(56) References Cited

U.S. PATENT DOCUMENTS

| 5,315,161 |   | 5/1994  | Robinson et al. | 307/66     |
|-----------|---|---------|-----------------|------------|
| 5,319,571 | * | 6/1994  | Langer et al.   | 364/492    |
| 5,367,697 |   | 11/1994 | Barlow et al.   | 395/800    |
| 5,414,861 | * | 5/1995  | Horning         | 395/750.06 |
| 5,428,252 | * | 6/1995  | Walker et al.   | 307/64     |

FOREIGN PATENT DOCUMENTS

WO 94/12946    6/1994   (WO) .............................. G06F/15/56

OTHER PUBLICATIONS

PCT International Search Report for PCT/US 98/01530 dated May 14, 1998.

* cited by examiner

*Primary Examiner*—Ario Etienne
(74) *Attorney, Agent, or Firm*—Townsend and Townsend and Crew LLP

(57) ABSTRACT

An apparatus and method for tolerating failure of the AC power source in a power supply switchable between the AC power source and a battery, in a processor system having a set of one or more components subject to being powered down. When the failure of the AC power source is recognized, the power supply is switched from the AC power source to the battery. For a first period of time, the battery powers the processor system with all components powered on. The battery then powers the processor system with the specific set of components powered off for a second period of time. In one embodiment, a determination is made that the battery can power the processor system with the set of components powered down for a predetermined period of time. A determination of the first period of time is then made as the capacity of the battery exceeding the predetermined period of time, if the excess capacity is used to power the processor system with the set of components powered on. In effect, a processor system incorporating one embodiment of the invention rides through a first period of a power outage, operating as normal and masking the loss of AC power. For a second, predetermined period, the processor system shuts down optional hardware and maintains the state of memory using the battery power.

8 Claims, 3 Drawing Sheets

METHOD AND APPARATUS FOR TOLERATING POWER OUTAGES OF VARIABLE DURATION IN A MULTI-PROCESSOR SYSTEM

This invention relates generally to fault-tolerant multi-processor systems. In particular, this invention relates to methods for improving the resilience of a multi-processor system in power instability and power failure scenarios.

BACKGROUND OF THE INVENTION

Pre-existing systems provide the feature of tolerating power outages ranging in duration from small fractions of a second to hours. For the shortest outages, ranging up to tens of milliseconds, the tolerance has been absolute. Totally transparent operation has been provided.

Longer outages are not transparent. No service is provided during the power outage, but recovery (resumption of service) after the outage is relatively fast (typically less than one minute) due to preservation of full memory state and transparent resumption of all processes executing at the beginning of the power outage. This type of tolerance might be thought of as "hibernation" during the outage. Typically, this feature tolerates outages up to approximately two hours.

FIG. #_1 illustrates multiple processor subsystems #_110a, #_110b, . . . , #_110n composing a pre-existing multi-processor system #_100. Each processor subsystem #_110 includes two power supplies, IPS #_120 and UPS #_130; and a lost-memory detection circuit (not shown). Each processor subsystem #_110 also includes its respective processor logic #_140, including a memory #_180 and associated memory control logic #_190; a maintenance diagnostic processor (MDP) #_150; I/O controllers #_160; and IPC controllers #_170.

The interruptible power supply (IPS) #_120 supplies power to the processor logic #_140 (excluding the memory #_180 and some of the memory control logic #_190 but including the cache #_1H0, if any), the MDP #_150, and the I/O and inter-processor subsystem communications (IPC) controllers #_160, #_170. The uninterruptible power supply (UPS) supplies power to the memory #_180 and some of the memory control logic #_190.

The UPS #_130 typically includes a battery, such as the battery #_1A0. During normal operation, an alternating current (AC) power source (not shown) drives both the IPS and the UPS #_120, #_130 and charges the battery supply #_1A0. Should the AC power source fail, the battery power supply #_1A0 supplies power to the UPS #_130, thus enabling the UPS #_130 to maintain the contents of the memory #_180 valid during the power outage.

When the power supply control circuitry #_1I0 detects a loss of AC power, it asserts a signal #_1C0 herein termed the power-failure warning signal. This signal #_1C0 connects to the interrupt logic of its respective processor system #_110 so that software notices the loss of AC power via an interrupt.

The capacitance design of the power supply guarantees that the power-failure warning signal #_1C0 occurs at least a predetermined amount of time (5 milliseconds, in one embodiment) before power from the IPS #_120 becomes unreliable. The power supply control circuitry #_1I0 switches the UPS #_130 over to the battery supply #_1A0 and shuts down the IPS #_120 when the IPS #_120 becomes unreliable.

The predetermined time guarantee allows the software to do two things before power is lost. First, the software recognizes the interrupt (even though there may be times when the power-failure warning signal interrupt is masked off, resulting in some delay in recognizing the interrupt). Second, the software saves state as described in more detail below.

Processor subsystems #_110 with no cache or with write-through caches use a first predetermined guaranteed time. However, on processor subsystems #_110 with write-back caches, the time necessary to save cache to the memory #_180 can be substantial. An alternative, larger predetermined guaranteed time is calculated by estimating the worst-case time necessary to save every line of the largest cache.

When AC power returns, the power control circuitry resumes IPS-based operation, starts charging the battery supply #_1A0 again, and asserts a power-on signal. This signal causes the MDP #_150 to reset and bootstrap itself and then to control the resetting of the processor #_140.

The lost-memory detection circuit contains a flip-flop (not shown) to determine whether memory contents are valid after a power outage. The power-supply circuitry explicitly sets (e.g., to logical TRUE) the flip-flop whenever power from the UPS #_130 is restored. The processor subsystem #_110 clears the flip-flop (e.g., sets it to logical FALSE) during power-on processing, after saving its value into a reset control word. This flip-flop retains its value as long as UPS power #_140 is valid.

Boot code receives the reset control word when the processor #_140 is reset. The boot code uses this information to decide whether to initiate automatic power-on recovery when memory contents are valid or wait in a loop for instructions when memory contents were lost.

The power-failure warning signal $\pi$_1C0 (if not masked) raises a software interrupt, and the software begins executing a power-fail interrupt handler. The interrupt handler immediately stops all I/O activity. (This early action is necessary on systems without DMA I/O capability because the handling of reconnects could cause the state-saving steps described below to proceed too slowly, resulting in a failure to recover from a power outage.)

The main function of the power-fail interrupt handler, however, is to save such processor state as is necessary for resumption of operations after the power outage ends. While all processors (of known design) would save their working (general purpose) registers, different types of processors #_140 save different state. For example, translation lookaside buffer (TLB) entries and I/O Control (IOC) entries both exist in volatile processor state. Processors #_140 with TLB or IOC entries save such state to memory before power is lost.

After saving the necessary state, the power-fail interrupt handler sets a state-saved variable in system global memory to logical TRUE. This variable is initialized to FALSE at cold load or reload time and is also set to FALSE on a power-on event.

Next, the interrupt handler executes a power-fail shout mechanism, described below.

Finally, the interrupt handler executes the code responsible for somewhat gracefully stopping all I/O and IPC traffic and flushing dirty cache contents (if any) to main memory. For example, in the IPC case, both the sending and receiving DMA engines are instructed to finish handling the current packet and then stop operation. The completion status is saved for later use.

(When the network services return to normal operating mode, if the DMA engine was in operation when the power down was performed, then the saved status of that last operation is examined. If that completion was normal, then the DMA engine is restarted with any queued operations. If that completion was an error termination, then the normal error recovery for that operation is performed (except that notification of the client may be deferred because interrupts may be disabled). At the next opportunity for I/O interrupts, the aborted non-inter-processor-subsystem-communications transfers are delivered to network services clients.)

On systems with write-back caches, dirty cache lines are saved to memory as the IPS #_120 supplies the cache with power and thus its contents are not preserved during the outage.

Control then transfers to the software that signals the hardware to fence the external (I/O bus and IPC path) drivers so that garbage is not driven onto these busses when power becomes unreliable.

At this point, the software waits for one of two things to happen. One possibility is that this power outage is either very short or a brown-out. In this case, IPS power does not ever go away. If the IPS #_120 never fails, the power-supply hardware eventually stops asserting the power-failure warning signal.

The software monitors the power-failure warning signal. When the software notices the absence of the power-failure warning, it waits some period of time (50 ms in one embodiment) and then treats this situation exactly like a fresh power-on event as described below.

The other possibility is that the power outage is long enough to cause the IPS #_120 to fail. In this case, the software loops, watching the power-failure warning signal #_1C0 until it ceases to get IPS power. The MDP #_150 restarts automatically when IPS power returns and causes the processor #_140 to restart.

When IPS power is restored, the processor #_140 initializes itself (including, for example, processor caches) and starts executing boot code. It examines the reset control word to determine what kind of reset has occurred. The reset control word contains the value of the lost-memory detection circuit flip-flop, allowing the processor #_140 to determine whether the contents of the memory #_180 are valid. If the reset control word indicates that memory contents are valid, the boot code starts the operating system (preferably, the Nonstop Kernel®, available from the assignee of the instant invention) executing in a power-on interrupt handler.

The power-on interrupt handler completes the restoration of processor state and resumes execution of the interrupted process(es). Before this, however, it checks the state-saved flag. If this flag is FALSE, the power-fail interrupt handler did not have enough time to save state. In this case, the power-on interrupt handler halts the processor. If, however, the state-saved flag is TRUE, the power-on interrupt handler resets it to FALSE (in preparation for the next power outrage).

The power-on interrupt handler wakes up all processes and starts a regroup operation. The regroup synchronizes the processor subsystem #_110 with all of the other processor subsystems #_110.

IO processes (IOP's) are informed of the power-on event for several reasons. First, they may need to download microcode into I/O controllers that lost power during the outage. Second, they may decide to be more tolerant of delays—via longer timeouts or more retries—for a time after the power outage. Such tolerance allows, for example, time for disks to spin up. Alternatively, they may choose to wait until an I/O error has occurred and then inquire about power status.

Third, they may need to cancel or otherwise clean up state for I/O operations that had been started before the power outage.

Two different mechanisms, the power-on interrupt handler and individual I/O controllers, inform IOP's of power-on events. As described above, when a power outage recovery occurs, the power-on interrupt handler wakes up all processes. Any process that waits on this event is thereby notified of the power outage and recovery.

When an individual I/O controller is powered on it generates an appropriate interrupt. The corresponding operating system interrupt handler wakes up the IOP configured to own that I/O controller.

Finally, the power-on interrupt handler gets the program counter from the stack constructed by the power-fail interrupt handler and exits through that address. Execution thus resumes at exactly the point interrupted by the power-failure warning interrupt.

An inter-processor message system provides services for two power fail procedures: the Regroup operation and the power-fail shout mechanism.

Regroup

The Regroup mechanism ensures at various times that all processor subsystems #_110 have the same image of the system, especially which processor subsystems #_110 are part of the system #_100 and which are not. It is invoked whenever the consistency of the system image is in doubt. For example, the Regroup operation is invoked whenever the periodic IAmAlive messages are missing for some time from some processor. It is also invoked at power-fall recovery time by the power-on interrupt handler.

U.S. patent application Ser. No. 08/789,257, entitled, "Method and Apparatus for Distributed Agreement on Processor Membership in a Multi-Processor System," naming Robert L. Jardine et al. as inventors, filed on the same date as the instant application, under an obligation of assignment to the assignee of the instant invention, with Attorney Docket No. 010577-039800US, describes fully the Regroup operation and is, therefore, incorporated by reference herein. The description of the Regroup operation expressly and directly set forth herein is only a loose summary of the operation.

The regroup mechanism proceeds through several phases, broadcasting messages to all other processor subsystems #_110 that were known and agreed to be part of the system image prior to the event that caused regroup to start. The Regroup mechanism results in a new agreement about the system image and a commitment to that image by all of the surviving processor subsystems #_110.

At power-failure recovery time, the Regroup mechanism allows some flexibility in the recovery time for various processor subsystems #_110. If some processor subsystems #_110 were to recover from the power outage much more quickly than others, the slower processor subsystems #_110 would be declared down by the faster processor subsystems #_110.

Regroup has two modes of operation: a normal mode and a cautious mode. In the latter mode, the operation allows more time before ostracizing processor subsystems #_110 from the system #_100. A regroup operation that a power outage initiates operates in cautious mode.

Power-Fail Shout

In cautious mode, the Regroup mechanism generally allows processor subsystems #_110 enough time to recover from a power outage and continue operation. However, if the power outage is very short, the power outage may not be noticed uniformly by all processors and the Regroup mechanism would not normally be invoked in cautious mode.

This anomaly arises from the fact that each power supply #_120 has some capacitance that allows it to handle very short power outages (up to around a few tens of milliseconds in one embodiment) without generating a power-failure warning interrupt at all. These very short power outages are completely transparent to the software. This situation presents a race condition. If the power outage ho duration approximately equals the transparent ride-through capacity of the power supplies #_120, then the normal variations in components and configuration differences (for example, memory size) cause some processor subsystems #_110 to get the power-failure warning signal while others do not. Those processor subsystems #_110 that do not experience the power-failure warning will not know about the power outage, and they will not use the cautious mode of the Regroup mechanism.

If two or more processor subsystems #_110 experience a power-failure warning, there is no problem. The Regroup mechanism executes in cautious mode when more than one processor subsystem #_110 fails to check in. Avoiding the loss of two or more processor subsystems #_110 is important, so the algorithm allows extra time.

However, when only one processor subsystem #_110 is absent, the reasonable assumption is that it has failed, and the detection and recovery from single-processor subsystem failure is required to be relatively quick. Thus, if only a single processor subsystem #_110 experiences the power-failure warning, then the other processor subsystems #_110 regroup without it. Prior to the power-fail "shout" mechanism, such power outages often resulted in the failure of a single processor subsystem #_110.

U.S. patent application Ser. No. 08/265,585, now U.S. Pat. No. 5,928,368 entitled, "Method and Apparatus for Fault-Tolerant Multi-processing System Recovery from Power Failure or Drop Outs," naming Robert L. Jardine et al. as inventors, filed on Jun. 23, 1994, under an obligation of assignment to the assignee of the instant invention, with Attorney Docket No. 010577-031900US, fully describes the power-fail shout mechanism and is, therefore, incorporated fully herein by reference. The description of the power-fail shout mechanism expressly and directly set forth herein is only a loose summary of the mechanism.

The power-fail shout mechanism causes the broadcast of a shout packet from the power-fail interrupt handler to all other processor subsystems #_110. The receipt of this shout packet by other processor subsystems #_110 serves to inform each of the power outage, in case each does not receive a power-fail warning signal. When they learn of the power outage in this way, they execute any subsequent Regroup operation in cautious mode, which allows enough time for a processor subsystem #_110 to fully initialize itself and join in the regroup.

Experience has shown, however, that roughly ninety-five percent of all power outages last less than thirty seconds. Therefore, there is a need for a computer system which can transparently ride through power outages of some predefined duration before going to a memory-hold up model such as described above.

Also, the software of a processor may be able to determine more accurately the state of the power-outage relevant hardware and software, including the state of the backup battery, and from this state may be able to determine how long the processor can function transparently in the face of a power outage before having to switch to the memory hold up model described above. Accordingly, there is a need for a processor with intelligence to approximate its ability to transparently ride through a power outage of indeterminate length and to effect a switch to a memory-hold up model as that ability is exhausted by a continuing power outage.

Further, there is a need for a such processor with additional intelligence to change its state in order to increase its ability to transparently ride through a power outage of indeterminate length.

The power supply hardware consists of multiple components, interruptible and uninterruptible, and logic for switching between the two. Accordingly, there is a need for a less complicated power supply system that nonetheless provides power from an AC source when available and power from a battery when the AC source fails.

SUMMARY OF THE INVENTION

Herein are disclosed an apparatus and method for tolerating failure of the AC power source in a power supply switchable between the AC power source and a battery, in a processor system having a set of one or more components subject to being powered down. When the failure of the AC power source is recognized, the power supply is switched from the AC power source to the battery. For a first period of time, the battery powers the processor system with all components powered on. The battery then powers the processor system with the specific set of components powered off for a second period of time.

In one embodiment, a determination is made that the battery can power the processor system with the set of components powered down for a predetermined period of time. A determination of the first period of time is then made as the capacity of the battery exceeding the predetermined period of time, if the excess capacity is used to power the processor system with the set of components powered on.

In effect, a processor system incorporating one embodiment of the invention rides through a first period of a power outage, operating as normal and masking the loss of AC power. For a second, predetermined period, the processor system shuts down optional hardware and maintains the state of memory using the battery power.

BRIEF DESCRIPTION OF THE DRAWINGS

FIG. #_1 illustrates multiple processor subsystems composing a pre-existing multi-processor system #_100;

FIG. #_2 illustrates multiple processor subsystems composing a multi-processor system #_200 according to the invention; and FIG. #_3 is a time line of events for a power outage scenario.

DESCRIPTION OF THE PREFERRED EMBODIMENT

Figure 1:
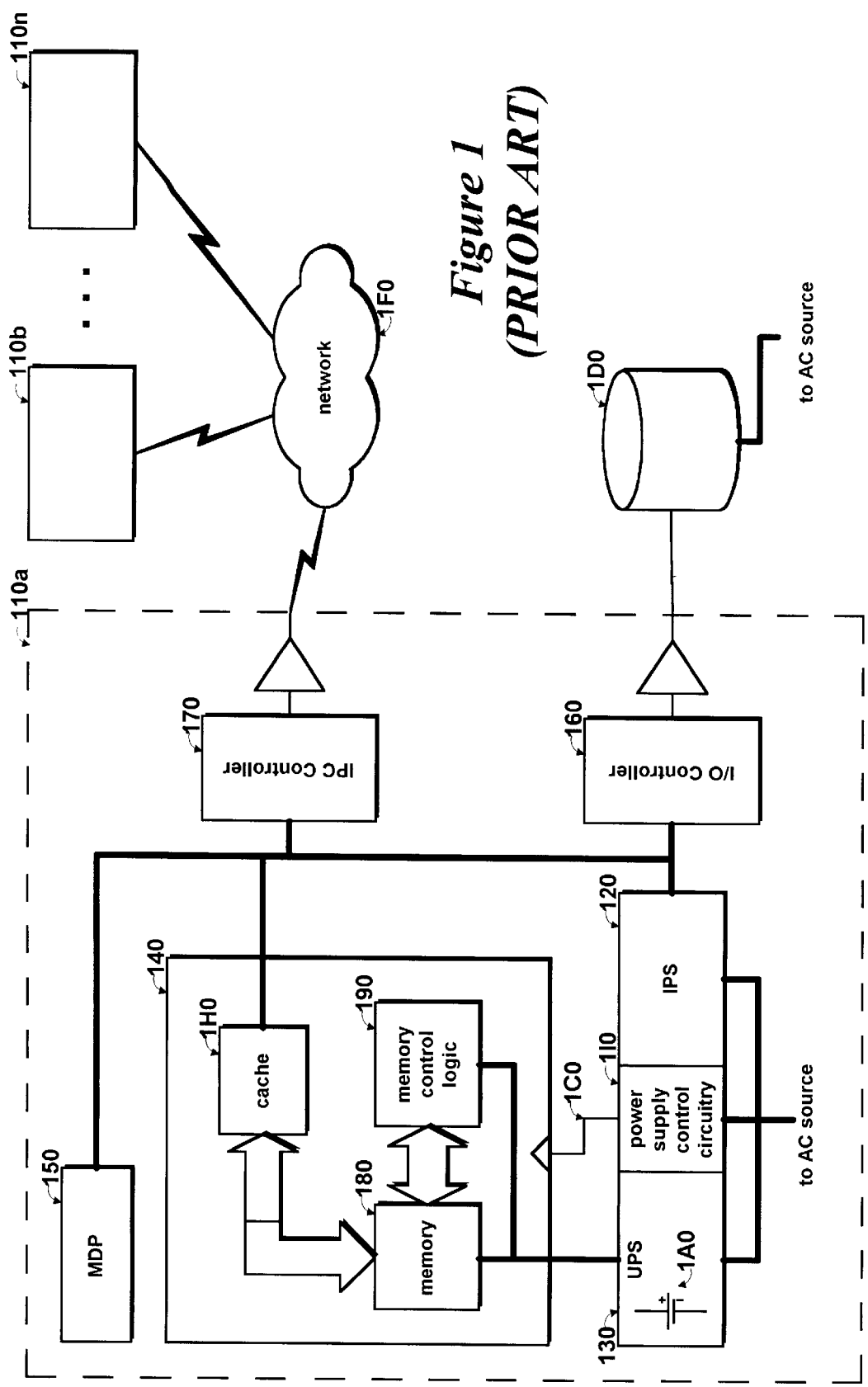
Figure 2:
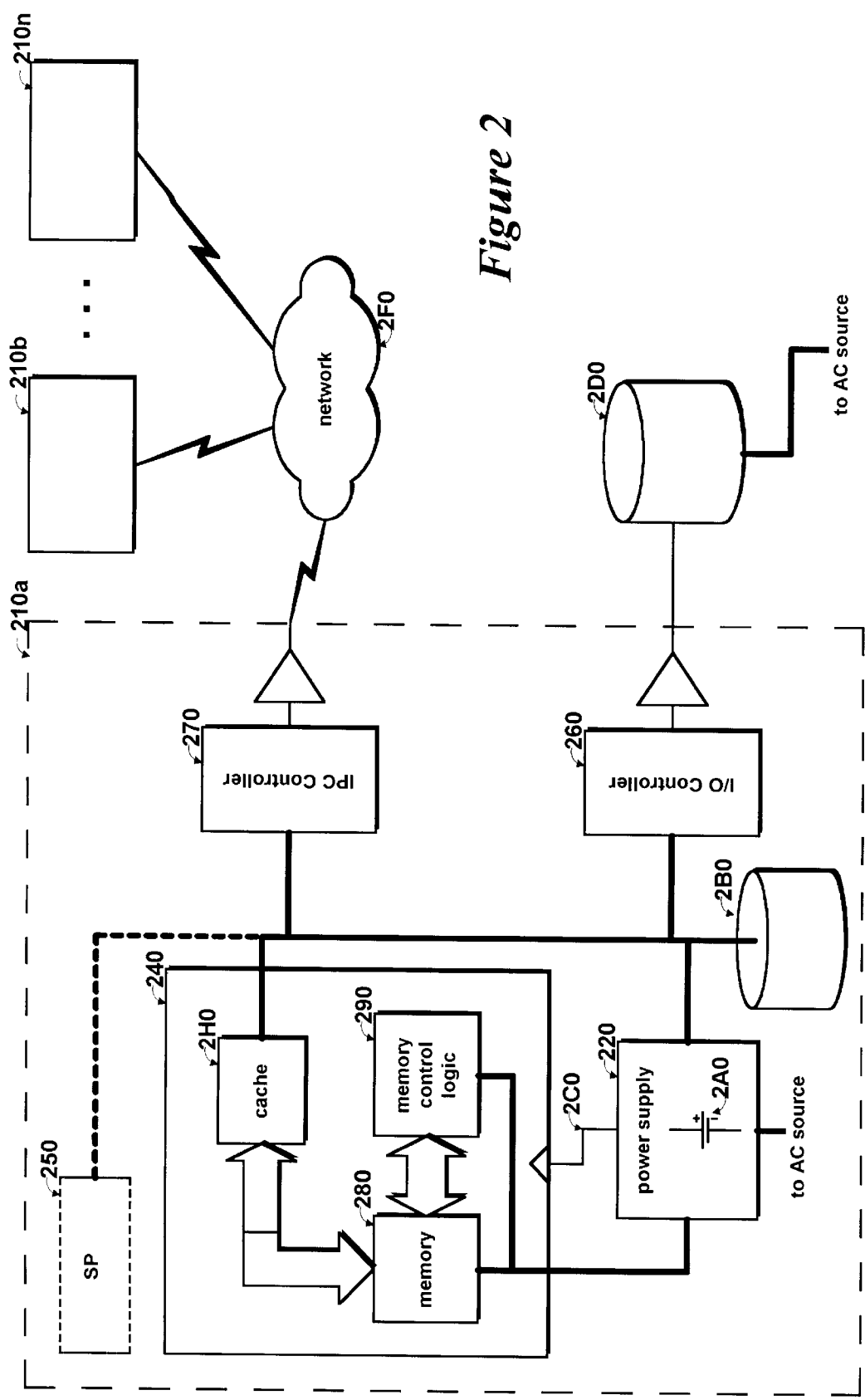
Figure 3:
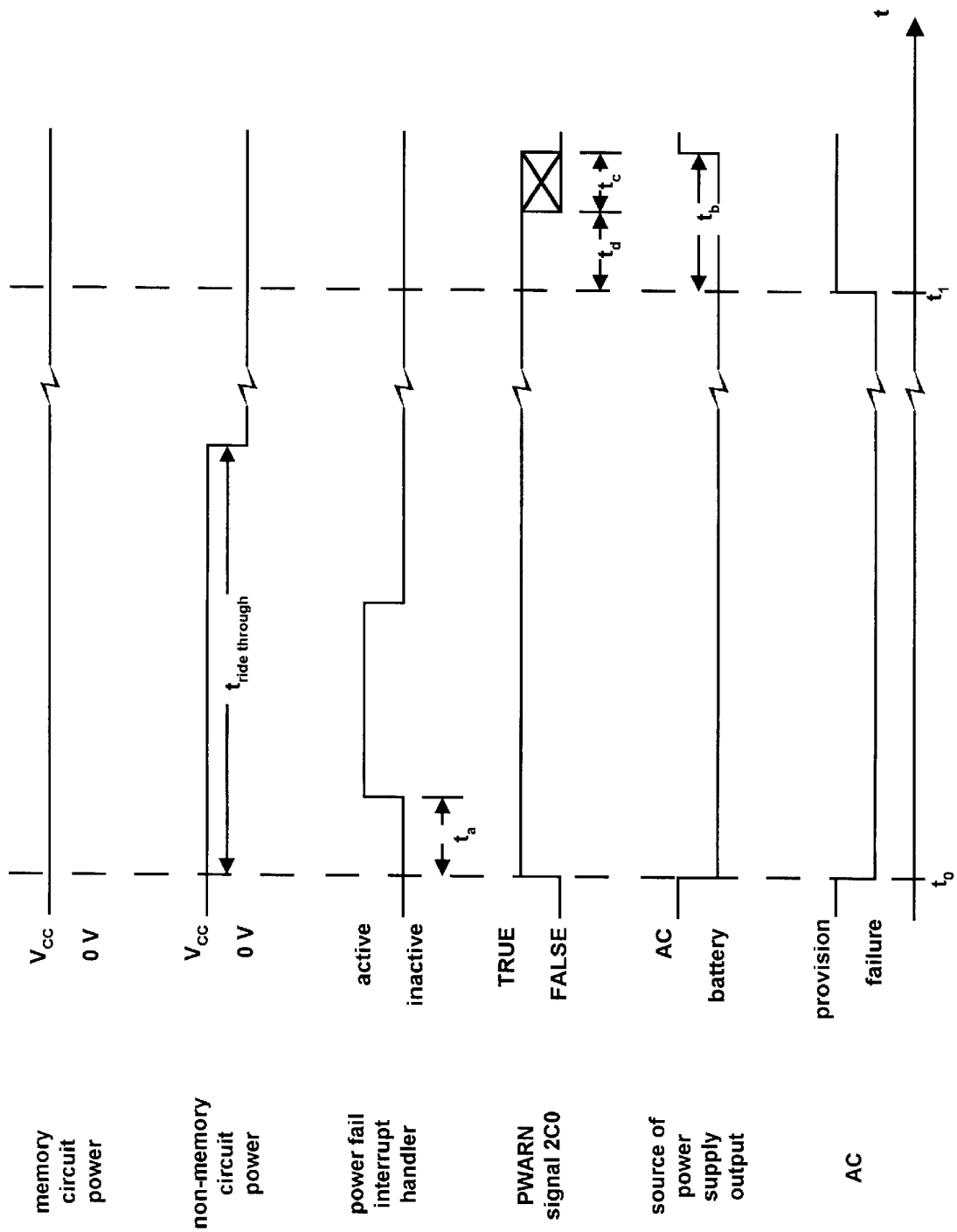

FIG. #_2 illustrates multiple processor subsystems #_210a, #_210b, . . . , #_210n composing a multi-processor system #_200 according to the invention. Each processor subsystem #_210 includes a respective power supply #_220, including a battery supply #_2A0. Each processor subsystem #_210 also includes its respective processor logic #_240 with a memory #_280 and associated memory control logic #_290; I/O controllers #_260; and IPC controllers #_270.

The power supply #_220 supplies power to all components of its respective processor subsystem #_210, including the memory #_280, controllers #_260, #_270, and any I/O devices #_2B0 contained within the processor subsystem #_210.

The processor subsystem #_210 includes a battery power supply #_2A0 which, when fully charged, can power every component, not just the memory #_280 and its associated logic #_290. A switchover to the battery supply #_2A0 occurs automatically when the AC power is lost. This switchover, however, does not imply that a loss of power (from the processor subsystem #_210's perspective) is imminent. Specifically, switchover to battery power does not automatically stop the processor #_240 from executing.

The battery supply #_2A0 in the processor subsystem #_210 is sized to provide full processor subsystem power, including all I/O controllers and I/O devices in the processor subsystem, to allow the processor subsystem #_210 sufficient full-system operation on battery power to save its state to disk. In one embodiment, UNIX® operating systems running on Sierra-class hardware, available from the assignee of this invention, several minutes of full-system operation on battery is provided.

In one embodiment, a minor, service processor or ASIC #_250 continues to execute during the entire power outage, including both the ride-through and the memory-hold up periods described herein below. The service processor or ASIC can determine whether the memory contents are valid by determining whether it ever lost power. In another embodiment, the processor #_240 itself continues operation. In this case, only the disks #_2B0 are powered off.

Overview

The first implication of the above is that software initiates memory hold-up operation. This operation does not occur automatically. The power-outage tolerance of pre-existing systems can be provided by initiating memory hold-up operation as soon as the hardware provides its indication of AC power loss. However, the batteries in systems embodying the invention provide enough power to run the full system up to a first predetermined amount of time (in one embodiment, 30 seconds) and still have enough capacity to hold memory contents valid for an additional predetermined amount of time (in one embodiment, two hours), assuming all unnecessary components are powered-off during this memory hold-up. Systems embodying the invention take advantage of this extra battery capacity, providing service transparently during the first predetermined (30-second) period. At the end of this first predetermined period, if AC power has not returned, software initiates memory hold-up mode.

This ability to choose raises a few issues. First, how do all processor subsystems #_210 in a system #_200 agree about when to initiate memory hold-up mode? Second, how do they coordinate with each other so that they all do so within a small period of time (in one embodiment, on the order of a second or so)?

Additionally, systems incorporating one embodiment of this invention are able to recover from non-homogeneous power failures. This capability is becoming increasingly important as long-distance fiber-optic connections prevail.

Closely related to the issue of non-homogeneous power failures is phase loss. The loss of one phase in a multi-phase AC power source can cause non-homogeneous outages. In fact, except for systems that are split into remotely-isolated parts for extremely demanding fault-tolerance applications, phase loss may be the most common reason for non-homogeneous outages.

An Outage Scenario

Herebelow is described an overview of the handling of a typical multi-minute power outage according to the invention. Such a power outage is fully homogeneous, that is, all processor systems lose power at substantially the same time. The batteries are fully charged. The power outage lasts several minutes but less than an hour, and the power returns in a homogenous way, i.e., within a few seconds for all processor subsystems #_210. Finally, no external disk or tape devices (e.g., data storage device #_2D0), are connected to the system.

FIG. #_3 is a time line of events for this power outage scenario. (FIG. #_3 is not to scale and illustrates relative timing only.) At time t0, the AC power fails. Immediately afterwards or after an insignificant amount of time, the power supply control circuity detects the loss of AC power and automatically switches over to the battery supply #_2A0.

The battery power supply #_2A0 supplies power to all components contained within the processor subsystem #_210, including disks, tapes, communications adapters, etc. The power supply #_220 asserts the PWARN power-failure warning signal #_2C0, thereby interrupting the processor #_240.

The processor #_240 formulates an estimation of the capacity of the battery #_2A0 and stores this information for later use.

If the power-failure warning interrupt is not disabled, it interrupts the software. If the power-failure warning interrupt is masked, it is delayed by a time $t_a$ until after an interrupt handler or other critical code restores the mask so that power-failure warnings are enabled. Typically, only the power-failure warning interrupt handler and the power-on interrupt handler themselves mask off (disable) the power-failure warning interrupt.

The power-failure warning interrupt handler begins execution. It logs the power-fail warning and decides how long to ride through. It records this decision in a system global variable. The power-failure warning interrupt handler initializes the time-list handler to perform the time-driven activities described below and returns to whatever code was interrupted.

Normal processing continues (in one embodiment, for around 30 seconds). During this time, the processor is periodically interrupted (every 300 milliseconds in one embodiment) to keep track of the ride-through time by checking and decrementing the variable representing the remaining ride-through time. Late in this period (about two seconds prior to the end in one embodiment), a message is sent to processes requiring such warning of the imminent power outage. This message allows the processes to avoid starting new logical operations that comprise multiple physical operations, for example.

Eventually, the ride-through time variable reaches 0. The processor subsystem #_210 then broadcasts a power-fail shout message to all processor subsystems #_210 including itself. (The self-message is the last one in the queue.) These messages are sent on redundant paths in order to maximize the probability of their delivery. The time-list interrupt handler then exits and processing again continues.

Because of several variables, it is not expected that all processor subsystems #_210 will receive and service power-failure warning interrupts at precisely the same time or that every power domain will have the same ride-through capability. Therefore, even in a homogeneous power outage, one processor subsystem #_210's ride-through time typically expires while other processor subsystems #_210 are still well within their ride-through periods. In this case, the other processor subsystems #_210 can expect to receive a power-fail shout message from the first one to finish its ride-through period.

This invention uses the power-fail shout mechanism differently than pre-existing systems. The pre-existing systems used the mechanism to notify all other processor subsystems #_210 of a power outage in one processor subsystem #_210. If only one processor subsystem #_210 noticed the power outage (due to variances in power-supply capacities and loads, for example), then that processor subsystem #_210 would disappear for a short time while it attempted to handle the outage. Upon receipt of a power-fail shout message, the interrupt handler sets a bit in the Regroup state information to force the next regroup incident into cautious mode, thus providing enough time for the missing processor subsystem #_210 to re-initialize and join in the regroup incident. On systems according to the invention, such a power glitch produces a power-failure warning interrupt followed immediately by a pseudo-power-on interrupt. No actual loss of power occurs.

In operating systems according to the invention, the power-fail shout mechanism solves the problem of coordinating all processor subsystems #_210 in going to low-power mode. In an abstract sense, the mechanism distributes the ride-through time. Each processor subsystem #_210 calculates its estimate of the ride-through time independently. When the first processor subsystem #_210 finishes its ride-through, it informs the other processor subsystems #_210 via a power-fail shout. All processor subsystems #_210 use this shout as the trigger to go to low-power mode.

All processor subsystems #_210 now receive a power-fail shout message, including the processor subsystem #_210 that sent them (it having also sent one to itself) and all of the processor subsystems #_210 that have not yet reached the end of their ride-through period. The receipt of such a message causes a processor subsystem #_210 to immediately perform the following steps: suspend locally-initiated I/O and drain the DMA engine; copy the return state from the interrupt handler's stack to a power-on handler's stack so that when the power-on interrupt handler exits, it resumes execution where the last pre-outage interrupt was taken; save any other necessary state; set the state-saved flag to TRUE; and call a low-level software routine (e.g., microcode).

The low-level routine writes cache lines back to main memory and cools down I/O and inter-processor subsystem communications (IPC) activity, allowing time for remotely-initiated operations to complete before, for example, disallowing access. Certain hardware registers are saved and the hardware is instructed to go to low-power mode.

In one embodiment, a service processor recognizes this instruction. The service processor waits for the arrival of the instruction from all processors in its domain until some timeout period (currently specified to be 1 second) elapses. The service processor instructs all non-processor domains (and all domains with processors that the service processor knows are down) to go to low-power mode. This default action in the absence of unanimity solves the problem of a power failure that occurs while one processor is halted.

In response to the low-power instruction, the hardware shuts down power to all disks and tapes in its processor subsystem (and performs other shut down operations such as powering down all unnecessary components).

In one embodiment, the processor #_240 goes into a reset state, minimizing its power consumption. In another, the processor #_240 continues to execute, perhaps using cache memory only. In some implementations, by not accessing main memory, the processors #_240 consumes less power. Slowing down the clock to the processor #_240 also results in lower power consumption. (Some laptop systems slow down their clocks at certain times to conserve battery power.)

The processor subsystem #_210 may also shut down cooling fans.

The low-level reset routine never returns. Instead, if the outage concludes as expected, operations will resume in the power-on interrupt handler.

A circuit such as an ASIC or a service processor (or even the processor #_240 itself) awaits the restoration of power, continuing to execute during this period. The memory #_280, of course, continually receives power, as does the memory control hardware #_290 which continually refreshes the DRAMS.

Shutting off the I/O adapters providing an interface between the network #_2F0 and the processor bus (not shown) is optional. The system designer resolves the trade-off between, on the one hand, saving the power the adapters consume while powered on and, on the other hand, saving the time necessary to re-configure the powered-off adapters when power comes back on.

AC power returns at time $t_1$. A time $t_b$ later, when DC power supplies reach the point of supplying sufficient voltage, the power supply #_220 automatically stops providing battery power. The power supply #_220 drops the power-failure warning signal #_2C0, interrupting the processor subsystem #_210. (Note that the power-failure warning signal #_2C0 may drop before the switch back to bulk power supplies.)

The processor subsystem #_210 waits some additional amount of time to be sure that power is stable. This time is generally longer than the maximum time $t_c$ that the fall of the power-failure warning signal #_2C0 can precede the power switchover at time $t_1+t_b$.

The processor subsystem #_210 powers up and re-initializes any components and ASICs that had power removed. The processor subsystem #_210 re-initializes the processor #_240 and starts it executing with a reset control word indicating power on with good memory.

In one embodiment, the state-saved flag is an integer variable instead of a Boolean value. A first predetermined value (say, 2) indicates that state has been successfully saved. A second predetermined value (say, 0) means that the processor subsystem is running normally. No power outage is in progress. After a power on, the process scheduler (dispatcher) interrupt handler sets the state-saved flag to a third predetermined value (say, −4) that is less than the second predetermined value (0). The time-list interrupt handler then increments (say, by one) the state-saved flag periodically (say, every 300 ms) until it reaches the second predetermined value (0). The variable stays at this second predetermined value until the next power failure event. While the variable is less than the second predetermined value, the message system is more tolerant of IPC errors. (Pre-existing systems also made such use of a non-Boolean state-saved flag.)

As the foregoing indicates, a vale of 2 for the state-saved integer variable is equivalent to a value of TRUE for its Boolean correspondent. Conversely, any value other than 2 is equivalent to a value of FALSE for the Boolean correspondent.

The boot reset sequence code initializes caches, I/O tables, etc. and then executes the power-on interrupt handler.

The power-on interrupt handler checks the state-saved flag, halting the processor subsystem #_210 if state was not properly saved. If, however, state was properly saved, the power-on interrupt handler clears the flag and resumes I/O operations.

The power-on interrupt handler causes an interrupt to the process scheduler (dispatcher) and triggers a regroup incident. The interrupt handler then logs the end of the outage. The power-on interrupt handler exits via the state that the IPC interrupt handler saved when the power-fail shout was received.

The dispatcher interrupt handler wakes up all processes. (To be more precise, a power-on-awake event is posted for each process. Whether the process notices this event or not depends on whether it waits on that event. In one embodiment, waiting on this event requires the process to be privileged.) It then exits.

The operating system (here, the Non Stop Kernel®) uses the Regroup algorithm to coordinate and verify that all processor subsystems #_210 are operational, allowing some variance (on the order of seconds in one embodiment) in the time power is restored and the length of time different processor subsystems #_210 take to initialize.

IOPs and other processes conspire to re-initialize their adapters and controllers as necessary, including the download of firmware.

All other processes resume execution.

Hardware

Dual power cords and dual power supplies supply power to a processor subsystem #_210. Some components receive power from the redundant bulk power supplies simultaneously in a way that allows one power supply (or power cord or AC source) to fail without affecting the component. For example, all internal disk and tape devices, all I/O adapters, and all network expanders are dual powered in one embodiment.

Some components receive power from only one of the redundant bulk power supplies. For example, in one embodiment, the components containing the processor #_240 and the memory #_280 receive their power from only one of the power supplies. In their cases, the failure of the one power supply (or power cord or AC source) causes one processor to fail. However, an embodiment may use dual power to supply its processor #_240.

The hardware provides battery backup power for all components contained within the processor subsystem #_210. These components include (without limitation) processors, service processors, ASICs, I/O adapters, network expanders, disks, and tapes. The batteries typically trickle charge whenever AC power is present, under control of a service processor or ASIC that controls the connection of the batteries to the rest of the system.

The power supply #_220 provides an automatic switchover to battery power when the AC power source fails. This switchover takes place quickly and smoothly enough so that it is transparent to the continued operation of all components.

The bulk power supplies and the batteries are both connected to power rails. Current is drawn from the higher of the two voltage sources, which is normally the bulk power supply. When the AC power source fails, the power-supply voltage declines over a period of time. When the power-supply voltage falls below the battery voltage, the switchover to the batteries is automatic.

When power switches over to the batteries, the hardware notifies the processor subsystem #_210. This notification takes the form of an interrupt that occurs whenever the power-failure warning signal changes value. The power-failure warning signal comes from the bulk power supply.

When AC power returns after an outage (and becomes sufficiently stable), the hardware provides automatic switchover back to the AC power source. Again, this switchover is smooth enough that it is transparent to the continued operation of all components.

When the AC power returns, the power-supply voltage rises over a period of time. The switchover is automatic when the power-supply voltage rises above the battery voltage.

The hardware notifies the processor subsystem #_210 when this switchover occurs.

Two characteristics of the timing of various events are specified and known to software. These are illustrated in FIG. #_3.

One characteristic is the time difference between the deassertion of the power-failure warning signal #_2C0 and the actual switchover between battery and bulk power supplies (the time $t_c$ in FIG. #_3). In one embodiment, this interval is specified to be less than 100 milliseconds. The processor subsystem #_210 uses this number to decide how long to wait before powering on components after a power outage ends.

The second characteristic is the time $t_d$ between the restoration of AC power and the deassertion of power-failure warning. During this time, some power supplies execute diagnostic tests, etc. (In one embodiment, this time is about 2 seconds.)

Either of these time parameters can produce undesirable results if it differs between power supplies #_220 in different processor subsystems #_210 within the system #_200. For example, if one processor subsystem #_210 returns from a power outage more than a few seconds before another processor subsystem #_210 returns, the first processor subsystem #_210 may declare the second processor subsystem #_210 down.

The Regroup algorithm provides some tolerance in this case, but the range is limited to a few seconds. Also, a processor subsystem #_210 waits (up to a couple of seconds in one embodiment) for communications to be restored between processor subsystems #_210.

Where there are multiple power supplies #_220 within a single processor subsystem #_210, the processor subsystem #_210 waits for all power supplies #_220 to reach the same state before powering on components.

The power subsystem can be connected to the Emergency Power Off (EPO) facility in a computer room installation. When the Emergency Power Off mechanism is invoked, the processor subsystem #_210 automatically disconnects the batteries a predetermined amount of time afterwards (4 minutes, in one embodiment).

Cold Power-On

When the power is first applied or when AC power returns after a manual shutdown or an outage that exhausted the battery capacity, the processor subsystem #_210 automatically cold loads. Due to the very execution of the cold-load path, the processor subsystem #_210 notes that memory contents are bad so that when it later resets the processor #_240, it will know what kind of reset to perform.

The processor subsystem #_210 responds to notification that AC power has been lost or restored. Each change in the power-failure warning signal #_2C0 generates an interrupt, as described above.

On AC loss, the processor subsystem #_210 formats and sends an informative message to all processors in the power domain of the processor subsystem #_210. This message contains information such as the identity of the power domain, the processor subsystem's estimate of its battery capacity, the cumulative component power consumption rate in this cabinet, and the cumulative component power consumption rate in this processor subsystem #_210 if all optional devices were shut off. This information is further described below. (In power domains that do not include processors, service processors (in embodiments containing service processors) format the same kind of information, forwarding it to a master service processor that then forwards it to all processors in the power domain of the master service processor. In an embodiment without service processors, the processor #_240 must gather information from other power domains, perhaps by reading register values out of ASIC's located in those power domains.

The power domain ID is necessary for power domains without processors. The domain IDs distinguish the various domains. Also, this information may be useful in the case of non-homogeneous power outages.)

On AC power restoration, the processor subsystem #_210 does one of two things, depending on whether it had previously attempted to go to memory hold-up (low-power) mode.

If AC power returns after an outage but during the ride-through time, then the processor(s) #_240 in the processor subsystem #_210 is still executing the operating system (preferably, the Non Stop Kernel®). In this case, the processor subsystem #_210 recognizes a pseudo-power-on situation. The interrupt handler first logs the pseudo-power-on situation, including the time of day and the power domain ID. Then it clears the ride-through time information, effectively cancelling the ride-through period.

Note that where the portion of processor subsystem #_210 that recognizes pseudo-power-on situations operates independently of that portion that effects low-power mode, there is a race. The processor subsystem #_210 could recognize a pseudo-power-on situation at the same time that it attempts to go to low-power mode. This race is described below.

If AC power returns after the processor #_240 in the processor subsystem #_210 has gone to low-power mode, but while the batteries #_2A0 still maintain the memory contents valid, then the processor re-initializes and starts the boot code running with a reset control word indicating a reset with good memory. (Note that the boot code may not be reloaded at this time. A main memory copy of the code should still be good.)

Battery Capacity Estimate

The processor subsystem #_210 estimates the capacity of the batteries #_2A0. This estimate need not be very precise, but it should be conservative. Because, however, it important for the processor subsystem #_210 to make an estimate useful in the face of multiple power outages, this estimate is not a binary decision (i.e., fully discharged or fully charged).

In one embodiment, the procedure for the estimate is as follows. The processor subsystem #_210 keeps track of how long the batteries #_2A0 have been charging (since the last power outage) and estimates the battery capacity via a formula based on that time. This formula is provided in Appendix A, "Power-Consumption and Battery-Charging Calculations."

In one embodiment, the processor subsystem #_210 assumes that the batteries #_2A0 fully discharge on every power outage. In an alternative embodiment, the processor subsystem #_210 tracks the duration of an outage. For short outages, this alternative approach allows longer ride-through periods for subsequent outages.

Component Power-Consumption Tracking

The processor subsystem #_210 tracks which components are present, what their types are, and whether they are powered on. It uses this information to form an estimate of the rate of power consumption during a ride-through period. Most components contain a SEEROM that contains the nominal rate of power consumption for that component. The processor subsystem #_210 adds these values together for all components that are present and powered on at the time of the outage.

Appendix A, "Power-Consumption and Battery-Charging Calculations," provides further information.

The processor subsystem #_210 also uses component-specific inrush duration information to determine how much time to wait between applying power to each component (especially disks) during power-on operations. Waiting prevents exceeding the current rating of the power supply #_220 due to transient power-on conditions.

The actual ride-through time chosen by the processor subsystem #_210 is the minimum of three values. One value is the calculated ride-through time as described above. Another value is the ride-through time provided by the system operator via the system configuration facility. The third is the delay in the automatic low-power mode as described below.

Also, it is possible for a user to configure the system so that no ride-through occurs. This option is useful in systems using significant external disk storage or other external devices that are not battery powered. If these storage devices hold data critical to the continued delivery of service, even through they receive no battery power, then a ride-through cannot occur. The effect of a ride-through attempt will be disk access errors and unnecessary battery drainage.

Also, an extended ride-through period allows customers to implement an inexpensive Universal Power Supply (UPS) option. Motor-generator systems have been less expensive than true UPS systems. On the other hand, a motor-generator system takes on the order of 30 seconds to power up. Thus, this option allows customers to avoid the cost of a true UPS system while receiving the same benefit.

A processor subsystem #_210 may receive many power-failure warning interrupts. Each interrupt may cause the calculation of a new ride-through time that may be less than the previously-calculated ride-through time. Thus, the ride-through time variable is actually set to the minimum of these two values.

Batteries can be damaged if they are completely discharged. The processor subsystem #_210 ensures that this condition never occurs. While operating on battery power, the processor subsystem #_210 periodically checks the condition of the battery #_2A0. If the batteries #_2A0 are nearing exhaustion, the processor subsystem #_210 commands the hardware to shut down completely (until AC power returns).

Battery and Power-Supply Diagnostics

The processor subsystem #_210 performs periodic diagnostic tests on the batteries #_2A0 and the power supplies #_220. For example, it is important to know whether the batteries are functioning correctly before they are needed during a power outage.

An interesting issue is that a real power outage could occur during one of these diagnostic tests. The processor subsystem detects this case, terminates the diagnostic test, and then responds to the power outage as usual.

What's Left on During Low-Power Mode?

During low power mode, the following components are powered: service processors (in embodiments employing them), I/O adapters providing an interface between the network and the processor bus #_2C0, in fact, the entire component containing the service processors, and the main processor(s) #_240.

While only the main memory #_280 and associated refresh logic #_290 are required to retain memory, this retention may involve powering the whole processor #_240. In that case, unnecessary components may be held in scan-reset mode or some other mode that keeps power consumption low.

Component Power Sequencing

In some cases, the processor subsystem #_210 must be careful about the order in which it powers on components and about the interval between applying power to the components. Powering on all components at the same time would cause a higher current demand than the power supplies #_220 are capable of supplying.

However, during a power outage recovery, the processor subsystem #_210 cannot afford to wait to power on all other components (especially the processors) until the disks have been powered on. Otherwise, a processor subsystem #_210 containing a small number of disks would come up many seconds before a processor subsystem #_210 containing a large number of disks. Therefore, according to one embodiment, the processor subsystem #_210 performs its power on sequence in this order: power on, check, and reconfigure all components containing network routers and endnodes; reset and start the main processors; and power on all disk components.

Because a disk may require several seconds to "spin up," the operating system and disk subsystem software are appropriately tolerant of errors during power-fail recovery.

During a power outage, a processor subsystem #_210 powers off some components. When power is restored, the processor subsystem #_210 powers these components back on and configures them. This configuration process generates all of the same events that it would generate if a component were inserted and then configured except for the insertion event. Thus, an I/O subsystem can use these events as a trigger for its initialization process, including the download of software.

During a power outage, an I/O subsystem may get a configuration event for a controller that was already known to be present and configured. Therefore, the I/O subsystems does not treat an unexpected configuration event as an error situation.

Some external devices may have their own protocol for notification of power-related events particularly to notify the host that they require reinitialization. This notification is given to a process or series of processes that notifies the appropriate wide-area network IOP.

Due to interrupt masking, the processor subsystem #_210 may receive a sequence of power-failure warning commands and pseudo-power-on commands. Thus, the subsystem #_210 queues these commands and handles them in order.

The power-failure warning interrupt handler is invoked in response to the assertion of the power-fail warning signal #_2C0 and in response to a pseudo-power-on situation. One embodiment treats pseudo-power-on interrupts as a variation of a power-failure warning interrupt in order to simplify interrupt masking. Power-on interrupts have no masking capability because they are not true interrupts. Rather, they are an entry point into the operating system, much like an alternative bootstrap point. However, pseudo-power-on interrupts are true interrupts, so interrupt masking is typically made available.

Status Procedure

A callable procedure allows clients such as I/O processes to determine whether a ride-through is in progress (on the processor subsystem #_210 in which it is called) and/or if a power outage has occurred recently. This routine can be used during I/O error recovery, for example, to determine whether extra time or atypical recovery actions are warranted.

In one embodiment, this routine has no parameters and returns a 32-bit mask value, defined as follows:

Bit 0 (Ride-Through in Progress): 1 if a power-fail ride-through is currently in progress;

Bit 1 (Power Outage Imminent): 1 if a power outage is imminent (within the next 2 seconds);

Bit 2 (Power Ride-Through Ended Recently): 1 if a power outage ended within the last 60 seconds and that power outage was short enough to be covered by the ride-through period;

Bit 3 (Power Outage Ended Recently): 1 if a power outage ended within the last 60 seconds and that power outage was long enough to cause a full transition to low-power mode and back; and Bits 31 through 4: reserved for future expansion; values undefined.

An agent keeps a timestamp related to the last power-on in order to provide the information for the "Power Outage Ended Recently" bits. The other two bits can be implemented from the information controlling the two phases of the ride-through period.

Races and Variations

This section provides a description of the various races and timing windows in the outage scenario described above, as well as in several variations on that scenario.

Races in the Normal Power Outage Scenario AC Returns During the Ride-Through Period In this case, the processor subsystem #_210 recognizes a pseudo-power-on situation and invokes the power-failure warning interrupt handler with a parameter that indicates the pseudo-power-on situation. The power-failure warning interrupt handler checks whether the first portion of the ride-through time has expired.

Assume that the pseudo-power-on situation occurs before the first portion has expired. In this case, the power-failure warning interrupt handler clears the ride-through time indicator. No power-fail-imminent messages are sent and no actual shut down occurs.

AC Returns Late in the Ride-Through Period

Now assume the same as above except that the power-failure warning interrupt handler determines that the first portion of the ride-through time has expired but the second one has not.

In this case, the interrupt handler will have sent out system messages warning of imminent power failure. Therefore, it now sends out an "all clear" system message and clears the remaining portion of the ride-through time.

AC Returns During Execution of Low-Level Routine

In this case, assume that the processor subsystem #_210 recognizes the pseudo-power-on situation after the entire ride-through period has expired, and the operating system's time-list interrupt handler has already initiated the shutdown.

The resolution of this race is that the processor subsystem #_210 ignores any pseudo-power-on situations once the operating system calls the low-level routine. That is, the processor subsystem #_210 makes the following policy: Once the low-level routine has started, the subsystem is committed. The only way out of this situation is for the processor subsystem #_210 to do a power-on reset of the processor #_240.

The processor subsystem #_210 must deal with the near-simultaneous transition to low-power mode and the end of an outage. There are several cases to consider:

First, the operating system software may decide to go to low-power mode after AC power has already recognized a pseudo-power-on situation. This could happen because the determinations are made in distinct components of the processor subsystem #_210 and the cross-informative messages "crossed in the mail" It could also happen because the processor subsystem #_210 ignored the pseudo-power-on situation because it was already in the low-level routine or beyond.

Second, in an embodiment with a service processor, the operating system software may decide to go to low-power mode and informs the service processor of that decision, but AC power returns before the service processor gets done with the resulting processing.

Third, the processor subsystem #_210 may decide to go to low-power mode from one processor and AC power returns before it gets the same command from the other processors in its domain. (This scenario can occur when two or more processors share the same power domain.)

The bottom line in all of these cases is that the processor subsystem #_210 must either go to low-power mode or pretend that it did. If the power is actually out, it should go to low-power mode. If the power is not out (or returns during this period), the processor subsystem #_210 treats the processor(s) #_240 as if it had reset them for low-power mode.

Multiple Processors Shout

With different component tolerances, different clock rates, different dynamic situations such as interrupts masked off, etc., that two or more processor subsystems #_210 will terminate their ride-through periods and "shout" within milliseconds of each other is unlikely. However, it is possible.

For simplicity, consider the case in which two processor subsystems #_210 start shouting at the same time. If the shouts are sent in an interruptible state, then each processor subsystem #_210 could interrupt the other processor subsystem #_210 out of its shout loop, and neither one would finish shouting to the other processors subsystems #_210 (which are still within their ride-through periods). Both of the shouting processor subsystems #_210 would proceed to low-power mode without informing the others.

This problem is solved either by keeping interrupts masked off during the shouting or by using any of the mechanisms known in the art to effect or mimic a broadcast. Although not a true broadcast, such a mechanism does deliver all of the messages to be "broadcast" in a single (atomic) group. Thus, once shouting has been initiated by any processor subsystem #_210, all of the shout messages are sent.

The software entity that drives the shouting must handle errors. For example, where one shout message times out and the rest in the queue behind the failing shout do not get sent automatically, the shouting processor subsystem #_210 looks for these errors and restarts the queue to bypass the failed message.

Ordering Power-Failure Warnings and Pseudo-Power-On's for Multiple Domains

Assume that the power outage is brief and that the system includes at least two power domains. Further assume that the power-failure warning and pseudo-power-on events for one domain are both generated and delivered quickly. If the power-failure warnings from some other domain are delivered after the pseudo-power-on from the first domain, the behavior of the system is undetermined. (Power-failure warnings and pseudo-power-on's from a single domain do not occur out of order with respect to each other, but power-failure warnings and pseudo-power-on's from multiple domains can be interleaved.)

Including a flag bit in the power-failure warning informative message and power-failure warning interrupt parameters solves this problem. The flag indicates whether the power-failure warning is from the processor's own power domain or is forwarded from another domain. (In one embodiment, a processor subsystem #_210 uses power-failure warning interrupts from other domains only to keep track of their battery capacities and power loads so that the processor subsystem #_210 can calculate an overall ride-through time. Power-failure warning interrupts from other domains do not trigger a ride-through. A power-failure warning from only the processor subsystem #_210's own domain triggers a ride-through, and a pseudo-power-on from only the processor's own domain ends the ride-through.

This solution depends on proper ordering of power-failure warning and pseudo-power-on events only within one domain, not among multiple domains. This solution also means that the processor subsystem #_210 need not forward pseudo-power-on messages from other domains. It must still forward power-failure warning messages for their battery capacity and load information.

(A solution of counting the power-failure warning and pseudo-power-on events is too complex and is subject to failure due to lost messages between domains or lost commands.

Another solution of correlating these power events for each domain is also too complicated. Explicitly providing a flag bit is easier.

Another solution involves having the processor subsystem #_210 delay the pseudo-power-on until it has received power-failure warnings from all domains, thus effectively ordering all of these events for all domains. Of course, this implies a time-out mechanism and seems unnecessarily complicated.)

Very Short Power Outages

Very short power outages were difficult to handle correctly in pre-existing systems. In fact, short outages caused the invention of the power-fail shout mechanism. However, for systems according to the present invention, these outages are rather simple to handle.

The first category of very short outages is those so short that they are masked by all power supplies #_220 in the system #_200. This category even pre-existing systems handled correctly. If all power supplies mask the outage, no portion of the system #_200 becomes aware of it and thus no portion takes care for it.

The second category is outages that are short enough to be masked by some, but not all, of the power supplies #_220. In this case, some processor subsystems #_210 may see power-failure warning interrupts, but others will not. This case required the power-fail shout mechanism. In systems according to the invention, these outages pose no problem, so long as any processor subsystem #_210 that receives a power-failure warning also recognizes a pseudo-power-on situation. As long as the outage is short enough that the pseudo-power-on situation occurs during the ride-through period, as described above, then no problem arises from one processor subsystem #_210 seeing the outage and starting a ride-through period while other processor subsystems #_210 do not.

Very Long Power Outages

A typical long power outage that the invention handles well is where the power outage lasts long enough to avoid all of the races in getting all power domains into low-power mode but short enough so that the batteries in all processor subsystems #_210 keep memory contents valid. In this case, all processor subsystems #_210 should recover as described herein.

The longest power outages eventually cause the batteries #_2A0 to exhaust their capacity to keep memory contents valid. Before this occurs, however, the processor subsystems #_210 should disconnect the batteries #_2A0 to prevent damage to them. The battery disconnection causes main memory contents to be lost. The disconnection also causes power to be lost to the processors or ASIC themselves that monitor the length of the power outage and effect the battery disconnection. When power returns, the processor subsystem #_210 autoboots and either autoloads the system or not, as described herein.

One race condition occurs if the power outage is long enough for some batteries #_2A0 to reach this exhausted state while others do not. In this case, some processor subsystems #_210 recover and others do not. The processor subsystems #_210 whose batteries #_2A0 have lasted receive a power-on reset with a flag(s) set indicating that memory is still good. They will go through normal power-fail recovery. The other processor subsystems #_210 receive a power-on reset with the flag(s) reset. They sit in halt loops waiting for a load command. The recovering processor subsystems #_210 regroup and ostracize the non-recovering processor subsystems #_210. This situation may or may not lead to a full system outage, depending on which processor subsystems #_210 are ostracized.

Multiple Power Outages

Races

In addition to races that occur in single power outages, there are race conditions that occur due to multiple outages. One such race involves a power outage that lasts long enough to cause a transition to low-power mode followed quickly by a very short outage. The second outage may be ridden through successfully, but it occurs before the handling of the first outage completes.

The handling of the second outage does not erase state used to recover from the first outage. In one embodiment, certain effects of the first outage do not complete in the power-on interrupt handler but delay for later handling by the dispatcher interrupt handler and subsequently invoked processes. These effects include the sending of a power-on message to each process and the setting of the state-saved flag to an effective Boolean FALSE. In general, anything deferred from the power-on interrupt handler to a later point in time must be handled carefully.

Some of these effects (for example, sending a power-on message to each process) are performed only on a full outage, not on an outage that is ridden through, so the recovery from the second outage takes care not to erase the state that triggers the postponed work from the first outage.

Battery Drainage

Multiple outages can cause a battery drainage problem if they occur before the batteries have a chance to fully charge.

The processor subsystem software estimates when the batteries #_2A0 are fully charged by tracking how long they have been charging and how long they have been providing power.

If the battery capacity is low enough to jeopardize memory hold-up time, the processor subsystem #_210 attempts no ride-through. The processor subsystem #_210 is very conservative in its estimate of battery capacity, as described more fully in Appendix A.

Outage During GLUP of the Ride-Through Configuration Parameter

A power outage could occur during a Global Update of the maximum ride-through configuration parameter. (The Global Update Protocol (GLUP) is described in U.S. Pat. No. 4,718,022 (1988) to R. Carr and is incorporated herein by reference.) Such a power outage should not cause a problem with the GLUP mechanism, just as a power outage is handled correctly during any GLUP. However, this race could cause some processor subsystems #_210 to choose very different times for the ride-through period. The normal shout-based synchronization at the end of the ride-through period should handle this race.

Of course, the program text for such software as is herein disclosed can exist in its static form on a magnetic, optical or other disk, on magnetic tape or other medium requiring media movement for storage and/or retrieval, in ROM, in RAM or other integrated circuit, or in another data storage medium. That data storage medium may be integral to or insertable into a computer system.

APPENDIX A

Power-Consumption and Battery-Charging Calculations

This appendix describes the computations of three values: the battery capacity, the load presented to the batteries, and the memory hold-up time available.

Battery Capacity

The first issue is how to estimate the capacity of the battery #_2A0. The processor subsystem #_210 uses this estimate when a power outage occurs.

The power #_220 supply generates a binary logic PS_GOOD signal #_2E0 that is TRUE whenever it is charging the batteries #_2A0. The processor subsystem #_210 has access to this signal and estimates the battery capacity based on how long it has been charging.

The formula for battery capacity as a function of charging time is non-linear. However, for practical purposes, a simple table estimation suffices. Whenever the PS_GOOD signal #_2E0 is FALSE, the processor subsystem #_210 resets its charging time accumulator #_2F0. If a power outage occurs while the PS_GOOD signal #_2E0 is FALSE, the processor subsystem #_210 reports that the battery has 0% capacity. (Thus, in these cases, the operating system will decide to go immediately to low-power mode in the event of AC failure.)

When the PS_GOOD signal #_2E0 is TRUE, the processor subsystem #_210 tracks how long the signal #_2E0 stays in this position. If a power outage occurs while the PS_GOOD signal #_2E0 is TRUE, the processor subsystem #_210 estimates the battery capacity according to Table I:

TABLE I

Battery Capacity Estimate

| Hours of Continuously TRUE PS_GOOD Signal | Percentage of Nominal Full Capacity |
|---|---|
| >= 45 | 100% |
| >= 5 and < 45 | 90% |
| >= 1 and < 5 | 80% |
| < 1 | 0% |

The capacity of batteries changes over time. A typical battery, when new, supplies about 80% of its rated capacity. Over the first year of life, this increases to around 110% of rated capacity, after which it declines back to around 80% of rated capacity over about 8 years. In one embodiment, this effect is ignored because tracking true battery age is too difficult and because enough other variables and conservative estimates built into the design make the tracking of this characteristic unnecessary.

The final issue is determining the capacity of the fully charged battery. In alternative embodiments, the power supply #_220 itself determines its fully charged capacity and makes that determination available to the processor subsystem #_210 in a SEEROM, or the capacity is predetermined and stored in a ROM available to the processor subsystem #_210, or the capacity is predetermined and hard-coded into the software of the processor subsystem #_210.

For one embodiment, the capacity of the battery #_2A0 when fully charged is 2.1 AmpHours (or 2100 milliAmpHours) per battery. When two power-intensive components are present, the total battery capacity is twice that, or 4.2 AmpHours. When a power outage occurs, the processor subsystem #_210 adjusts this nominal capacity (either 2100 or 4200, depending on whether one or both batteries are present) for the amount of charging time since the last outage as given in the above Table I.

Component Power Loads

The processor subsystem #_210 calculates the two loads needed (the ride-through load and the memory holdup load) by adding together the load for each component that is present and powered on. Thus, it needs the load presented by each component. Preferably, SEEROMs on each component provide this information. However, a table can statically provide this information.

TABLE II

Component Loads

| Component Type | Normal Operating (mA per Component) | Memory Hold-Up (mA per Component) |
|---|---|---|
| Processor Subsystem | 3050 | 700 |
| ServerNet Expander | 654 | 0 (powered off) |
| ServerNet Adapter | 1280 | 0 (powered off) |
| PMCU/Fan | 1040 | 84 (fan powered off) |
| Disk component | 446 | 0 (powered off) |

Power Consumption (Load)

Given some battery capacity and given some total power consumption rate, how long will the batteries continue to supply power? Indirectly, this is the same question as, "Given some total power consumption rate, how does the battery capacity change?" The first question is oriented towards calculating how long the system can remain in memory hold-up mode. The second question is oriented towards calculating how long the system can ride through with full transparent operation and still provide enough battery capacity for memory-hold-up mode.

The basic rule is that the logarithm of the time is inversely proportional to the logarithm of the rate of consumption of power. This calculation is $$t = \frac{K}{I^n}$$

where I is the load current, K is the battery capacity, and n is a static parameter of the battery. If K is expressed in AmpHours and I in Amps, then t is expressed in hours. (K is actually the number of AmpHours available from the battery at a current that would discharge it in one hour.)

This formula is linear in K but non-linear in I. The value of n, while in principle a parameter of a specific battery, does not change much, if at all, across batteries. Thus, for practical purposes, an estimation of the necessary values suffices. Empirically, n has been determined to be approximately 1.24. Thus, a table relating t to I can be constructed.

The following Table III provides the necessary information (normalized per AmpHour of battery capacity) for the example of Table II:

TABLE III

Run Time Estimate

| Battery Load in mA (milliAmps) | Estimated Run Time (minutes per AmpHour of battery capacity) |
|---|---|
| 400 | 186.9 |
| 720 | 90.2 |
| 1000 | 60.0 |
| 1300 | 43.34 |
| 1800 | 29.0 |
| 3200 | 14.2 |
| 4500 | 9.30 |
| 7800 | 4.70 |
| 11000 | 3.10 |
| 15000 | 2.10 |
| 19000 | 1.60 |

The processor subsystem #_210 presents two different loads to the battery at two different times: the load during ride-through, when all components are still drawing power, and the load during memory hold-up, when only the memory and the other circuitry described herein are still drawing power. An operating system according to the invention uses these two loads and the estimate of battery capacity remaining as follows.

Let the battery capacity estimate be called Batt_Capacity, the ride-through load be called Ride_Through_Load, and the memory hold-up load be called Hold_Up_Load. Let the Table III above be called Run_Time.

Define a lookup function on the Run_Time table, Interpolate_Run_Time( ), which takes a load in milliAmps as a parameter and returns the run time in minutes per AmpHour, interpolated from the Run_Time Table III. Interpolate_Run_Time( ) finds the two entries bracketing the specified load. Let's call the load less than the specified load the "lesser_load" and the load greater than the specified load the "greater_load." Then Δload is the difference between the greater_load and the lesser_load, and ΔRun_Time is the difference between the Table III run times indexed by the greater_load and the lesser_load.

A Run_Time_Rate is defines as the ΔRun_Time divided by the Δload. Run_Time_Rate is in unites of minutes per AmpHour per milliAmp.

Interpolate_Run_Time interpolates the desired run time as the run time indexed in Table III by the lesser_load, plus the Run_Time_Rate times the Δload. Code Example 1 below illustrates this function in pseudo-code.

```
Interpolate_Run_Time (load);
{
/* find the two entries lesser_load and greater_load
        bracketing load
/*
delta_load := greater_load - lesser_load;
delta_Run_Time := Run_Time [lesser_load] -
        Run_Time[greater_load];
    Run_Time_Rate := delta_Run_Time / delta_load;
    Run_Time:= Run_Time[greater_load] + Run_Time_Rate *
    delta_load;
    return Run_Time;
}
```

Code Example 1

Interpolate_Run_Time( )

Given Interpolate_Run_Time( ), the processor subsystem #_210 first calculates how much of the battery will be consumed by the planned memory hold-up period (here assumed to be two hours (120 minutes)). The processor subsystem #_210 calculates whether the batteries #_2A0 could keep the memory #_280 up if the subsystem #_210 went immediately to memory hold-up mode on the loss of bulk power. This calculation is given in Code Example 2.

```
#define Planned_Hold_Up_Time 120
    Max_Hold_Up_Time := Run_Time_Interpolate
    (Hold_Up_Load) *
        Batt_Capacity;
    if (Max_Hold_Up_Time <= Planned_Hold_Up_Time) then
        Ride_Through_Time := 0;
        /* there isn't enough battery capacity to ride
        through
            at all */
        exit;
```

Code Example 2

Determination Whether Planned Hold-Up Mode Possible

The processor subsystem #_210 now knows that enough battery capacity exists to hold up as planned. It then calculates the battery capacity that it can afford to use for ride-through while leaving enough for the planned (2 hour) memory hold-up period.

```
Ride_Through_Batt_Capacity := Batt_Capacity *
    (1 - Planned_Hold_Up_Time / Max_Hold_Up_Time);
    Ride_Through_Time :=
        Interpolate_Run_Time(Ride_Through_Load) *
        Ride_Through_Batt_Capacity;
exit;
```

Code Example 3

Determination of Ride Through Time

As an example, assume that the ride-through load is 7800 mA and the hold-up load 720 mA. Further assume that the battery capacity is 2.1 AmpHours. For a 720 mA load, the battery can supply power for 189 minutes (according to the above Table III, 2.1*90.2=189). Thus, if the subsystem #_210 went directly to memory hold-up mode, the batteries #_2A0 would last about 3 hours. However, the subsystem #_210 wants to hold up memory for 120 minutes, which will take 63% of the battery capacity. Thus, 37% of the battery capacity is left over and available for the ride-through period. A full 3.65 minutes of ride-through is available (based on 7800 mA load, the above Table III gives 4.7*2.1*0.37=3.65 minutes).

The algorithm described above for estimating battery capacity does not take into account the outage duration. Therefore, after any outage, it assumes 0% battery capacity. Furthermore, an hour passes before that estimate improves. Thus, multiple outage tests with interstices of less than one hour will not get any ride-through time except on the first outage. Furthermore, separate tests that are closer together than one hour will not act in the "expected" manner.

An improved estimation algorithm calculates the first-hour capacity using a piece-wise linear interpolation from Table I. For example, from 0 to 1 hour, the recharge is approximately a straight line from 0% to 80% at the rate of 1.33% per minute increase in capacity.

Another embodiment does not reset the battery capacity estimate to zero during an outage. Instead, the length of the outage is measured and used to calculate a better estimate of the battery capacity remaining.

Of course, the program text for such software as is herein disclosed can exist in its static form on a magnetic, optical or other disk, on magnetic tape or other medium requiring media movement for storage and/or retrieval, in ROM, RAM or other integrated circuit, or in another data storage medium. That data storage medium may be integral to or insertable into a computer system.

What is claimed is:

1. A processor system comprising:
   a component subject to being powered down;
   a power supply switchable between an AC power source and a battery;
   a processor, coupled to said power supply for receiving recognition of failure of said AC power source and coupled to said component; and
   a memory, coupled to said processor, wherein is located a computer program for causing said processor system to tolerate failure of said AC power source by
      recognizing failure of said AC power source; and in response to said recognition, switching said power supply from said AC power source to said battery;
      powering with said battery for a first period of time said processor system with said memory and said component powered on; and
      then powering with said battery for a second period of time said processor system with said memory powered on and said component powered off.

2. In a multi-processor system having a plurality of processor systems, each of said plurality of processor systems having a respective component subject to being powered down, a respective power supply switchable between an AC power source and a battery, and a respective memory, a method for tolerating failure of said AC power source on one of said plurality of processor systems, said method comprising:
   recognizing failure of said AC power source on said one processor system; and in response to said recognition, switching said respective power supply from said AC power source to said respective battery;

powering with said respective battery for a first time period said one processor system with said respective memory and said respective component powered on; and then powering with said respective battery for a second period of time said one processor system with said respective memory powered on and said respective component powered off.

3. The method of claim 2 wherein before said first step of powering is performed, the following steps are performed:

determining that said respective battery can power said one processor system with said respective memory powered on and said respective component powered down for a predetermined period of time; and determining said first period of time as the capacity of said respective battery exceeding said predetermined period of time if used to power said one processor system with said respective memory and said respective component powered on.

4. A multi-processor system comprising:

a plurality of processor systems, each of said plurality of processor systems having a respective component subject to being powered down; and a respective power supply switchable between an AC power source and a respective battery;

a respective processor coupled to said respective power supply for recognition of failure of said AC power source; and a respective memory, coupled to said respective processor, wherein is located a computer program for causing said processor system to tolerate failure of said AC power source by recognizing failure of said AC power source on said one processor system; and in response to said recognition, switching said respective power supply from said AC power source to said respective battery;

powering with said respective battery for a first time period said one processor system with said respective memory and said respective component powered on; and then powering with said respective battery for a second period of time said one processor system with said respective memory powered on and said respective component powered off.

5. The multi-processor system of claim 4, wherein a one of the plurality of processor systems assumes a low-power mode of operation at the conclusion of the first period of time and sends a low-power signal to the other of the plurality of processor systems; the other of the plurality of processor systems receiving the low-power signal to assume a low-power mode.

6. A multi-processor system comprising:

a plurality of processor systems, each of said plurality of processor systems having a respective component subject to being powered down; and a respective power supply switchable between an AC power source and a respective battery;

a respective processor coupled to said respective power supply for recognition of failure of said AC power source; and a respective memory, coupled to said respective processor, wherein is located a computer program for causing said processor system to tolerate failure of said AC power source by recognizing failure of said AC power source on said one processor system; and in response to said recognition, switching said respective power supply from said AC power source to said respective battery;

powering with said respective battery for a first time period said one processor system with said respective memory and said respective component powered on; and then powering with said respective battery for a second period of time said one processor system with said respective memory powered on and said respective component powered off; and a network, coupling said plurality of processor systems.

7. In a multi-processor system having a plurality of processor systems, each of said plurality of processor systems having a respective component subject to being powered down, a respective power supply switchable between an AC power source and a battery, and a respective memory, a method for tolerating failure of said AC power source, the method including the steps of:

recognizing failure of said AC power source to switch each said respective power supply from said AC power source to said respective battery;

powering with said respective battery for a first time period each of said plurality of processor systems with said respective memory and said respective component powered on;

then powering with said respective battery for a second period of time each of said plurality of processor systems with said respective memory powered on and said respective component powered off;

a one of the plurality of processor systems concluding said first period of time by sending a low-power signal to each of the other of the plurality of processor systems, and assuming a low-power mode of operation; and receiving at each of said other of the plurality of processor systems said low-power signal and responding thereto to power with said respective battery for a second period of time each of said plurality of processor systems with said respective memory powered on and said respective component powered off.

8. The method of claim 7, wherein the assuming low-power mode of operation by the one of the plurality of processor systems includes powering with said respective battery only said respective memory.

* * * * *